(12) United States Patent
Haines et al.

(10) Patent No.: US 6,496,313 B1
(45) Date of Patent: Dec. 17, 2002

(54) AUDIO-VISUAL DRIVE OPTIMIZED FOR RESPONSE TO A MISREAD SECTOR

(75) Inventors: Jonathan Williams Haines, Lafayette, CO (US); Brian John Higley, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 69 days.

(21) Appl. No.: 09/602,335

(22) Filed: Jun. 23, 2000

Related U.S. Application Data

(60) Provisional application No. 60/140,861, filed on Jun. 24, 1999.

(51) Int. Cl.$^7$ .............................. G11B 5/09; G11B 27/36
(52) U.S. Cl. ................................ 360/53; 360/31; 714/6
(58) Field of Search ........................ 360/53, 31; 714/6, 714/48, 52; 711/112

(56) References Cited

U.S. PATENT DOCUMENTS

| | | | |
|---|---|---|---|
| 4,216,506 A | 8/1980 | Ludtke et al. ............. | 360/74.1 |
| 4,357,626 A | 11/1982 | Romeas ...................... | 358/335 |
| 4,996,679 A | 2/1991 | Yoshio ........................ | 369/33 |
| 5,111,299 A | 5/1992 | Aoki et al. ................. | 358/209 |
| 5,133,079 A | 7/1992 | Ballantyne et al. .......... | 455/4.1 |
| 5,200,989 A | 4/1993 | Milone ........................ | 379/53 |
| 5,247,126 A | 9/1993 | Okamura et al. ............. | 84/609 |
| 5,286,907 A | 2/1994 | Okamura et al. ............. | 84/601 |
| 5,442,638 A | 8/1995 | Awad et al. | |
| 5,644,310 A | 7/1997 | Laczko, Sr. et al. ........ | 341/143 |
| 6,366,980 B1 * | 4/2002 | Haines et al. ................ | 711/112 |

FOREIGN PATENT DOCUMENTS

| | | |
|---|---|---|
| EP | 0 880 136 A2 | 5/1998 |
| JP | 05020789 | 1/1993 |
| JP | 09223367 | 8/1997 |
| WO | WO 98/03970 | 1/1998 |

* cited by examiner

*Primary Examiner*—Regina N. Holder
(74) *Attorney, Agent, or Firm*—Nicholas P. Johns; Merchant & Gould P.C.

(57) ABSTRACT

Herein is disclosed a method and apparatus for optimizing a disc drive for audio-visual data storage and retrieval by responding to a certain read-time error in a manner that preserves data flow. In response to a read-time error in which a data sector is misread, the disc drive responds by transferring the errant data to the host nonetheless, and then by informing the host of the error. The data may be partially corrected by an error correction function. The aforementioned behavior is a departure from the traditional sequential paradigm of a conventional disc drive. The new behavior preserves data flow, a quality important to audio-visual drives.

5 Claims, 6 Drawing Sheets

AUDIO-VISUAL DRIVE OPTIMIZED FOR RESPONSE TO A MISREAD SECTOR

RELATED APPLICATIONS

This application claims the benefit of the filing date of U.S. Provisional Patent Application Ser. No. 60/140,861 filed Jun. 24, 1999 and entitled "DRIVE OPTIMIZED FOR AUDIO-VISUAL DATA STORAGE."

FIELD OF THE INVENTION

This application relates to hard disc drives and more particularly to an apparatus and method for efficiently storing and retrieving audio-visual data on a hard disc drive.

BACKGROUND OF THE INVENTION

Traditionally, disc drives have been designed in accordance with certain fundamental assumptions regarding the importance of data integrity and data flow. For example, it has traditionally been assumed that informational integrity is of paramount concern; even a single-bit error in loading an executable file could cause untold run-time ramifications. As a result, a traditional disc drive would attempt to read target data, perhaps multiple times, if the drive determined that a data error had occurred during a read operation. Additionally, conventional disc drive performance has been measured by assessing the average time consumed in performing a command. As a consequence, it is acceptable—even desirable—for a conventional disc drive to attempt to read and re-read data until the data is either read correctly, or until there is a miniscule probability that the data can actually be read properly. The time consumed in multiple re-attempts of a single read operation is of little consequence to average command times (the metric against which conventional disc drives are measured), if this sort of multiple-retry event occurs infrequently.

A disc drive which is optimized for audio-visual data storage and retrieval should be designed according to different fundamental assumptions regarding the importance of data integrity and data flow. Data integrity is of diminished importance for such a disc drive. A minor inaccuracy stemming from a small error would be minimally observable, if at all, by a viewer of the visual signal. However, reliable data flow is critical for an audio-visual drive. For the sake of illustration, consider an individual viewing a video signal. Such a viewer may not be able to notice a small error in a data stream, but the viewer will notice a three-second delay introduced into the data stream by a drive which repetitively attempts to correctly re-read an errant bit. Accordingly, the performance of an audio-visual drive should be measured against the maximum time consumed to complete a command. Worst-case scenarios for command completion, rather than average-case scenarios, are of central concern in an audio-visual disc drive.

The decision to optimize data integrity and minimize average command times in conventional disc drives has influenced many design considerations in such drives. Many of the design choices made to accommodate the requirements of a conventional disc drive are inappropriate for an audio-visual disc drive.

A conventional disc drive is designed to minimize average seek times. To accomplish this, the actuator arm is designed to be light, so as to minimize its rotational inertia. Also, the magnetic force imparted on the actuator arm is maximized by immersing the coils on the windings of the actuator arm in a strong magnetic field. Both of these mechanical choices, taken in concert, maximize the acceleration of the actuator arm, thereby minimizing average seek times. A consequence of those design choices is that the actuator arm approaches an unstable state. As a result of this instability, a small fraction of disc commands may occasionally require many retries to function properly, thereby yielding a very high maximum command completion time (a property undesirable in audio-visual disc drives).

Conventional disc drives have also been designed to operate at relatively high spin rates, so as to minimize rotational latency. An effect of operating at a high spin rate is that track following is made less reliable, meaning that an occasional command may take several retries to be properly effectuated. Once again, since audio-visual disc drives need to minimize command completion times for worst-case scenarios, this effect is undesirable.

Additionally, conventional disc drives have been designed to optimize informational integrity with respect to the manner in which such drives react to read-time and write-time errors. As will be discussed in greater detail, conventional disc drives behave sequentially duing read and write operations. As an example of sequential behavior, a conventional disc drive will not attempt to read a particular sector until the previous sector has been correctly read. If a read-time error occurs with respect to a given sector, a conventional drive will cease further attempts at reading successive sectors, until the disc has completely rotated and the errant sector can be properly read. Only then, will a conventional disc drive attempt to read successive sectors. A conventional disc drive behaves in a parallel manner during write commands, as well. In short, a conventional disc drive preserves data integrity at the expense of data flow. Accordingly, there is a need for a disc drive that responds to certain read-time and write-time errors in a manner that preserves data flow.

SUMMARY OF THE INVENTION

The method and apparatus in accordance with the present invention solves the aforementioned problem and other problems by responding to a certain read-time error in a manner that preserves data flow. More specifically, in response to a read-time error in which a data sector is misread, the disc drive responds by transferring the errant data to the host nonetheless, and then by informing the host of the error. The data may be partially corrected by an error correction function.

The aforementioned behavior is a departure from the traditional sequential paradigm of a conventional disc drive. The new behavior preserves data flow, a quality important to audio-visual drives.

These and various other features as well as advantages which characterize the present invention will be apparent from a reading of the following detailed description and a review of the associated drawings.

DETAILED DESCRIPTION

Figure 1:
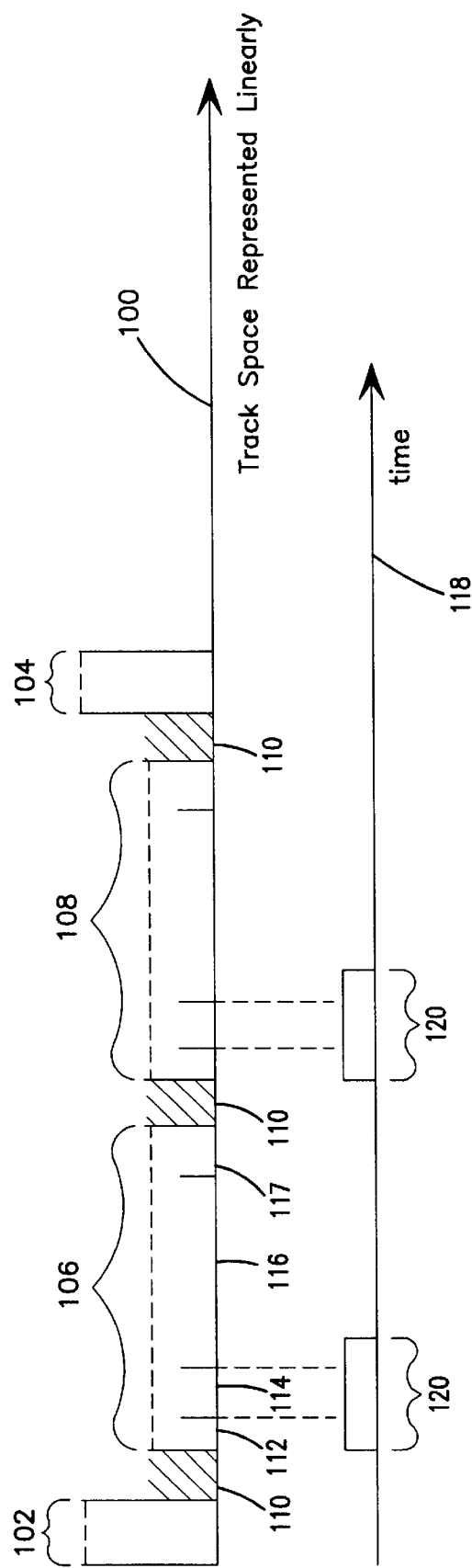
FIG. 1 is a depiction of track space, represented linearly.

To illustrate the design choices applied in a conventional disc drive, the read-time behavior of a conventional drive will be discussed with regard to FIG. 1. In FIG. 1, line 100 depicts track space, represented linearly. An examination of track space 100 reveals its general structure: servo bursts 102, 104 bound two sectors 106, 108. Servo bursts 102, 104 and sectors 106, 108 are separated by gaps 110. Although FIG. 1 shows a track space consisting of two sectors 106, 108 following each servo burst 102, 104, this ratio is a matter of design choice. The structure of each sector 106, 108 is also illustrated. A sector 106, 108 originates with an automatic gain control (AGC) field 112, which is used to tune an amplifier in the detection circuitry of the disc drive. Immediately following the AGC field 112, is a synchronization (sync) field 114, which is used as a timing reference to allow the disc drive to anticipate the location of data bits in the following data field 116. Finally, an error correction code (ECC) field 117, used to check the integrity of the data read from the data field 116, terminates each individual sector 106, 108.

A conventional disc drive performs a read operation by keeping track of each servo burst 102, 104 as it passes underneath its head. Each servo burst 102, 104 contains information from which head position, head velocity, and track number can be derived. The disc drive uses each servo burst 102, 104 to determine if the head is staying on course as it reads the data within each sector 106, 108. Each servo burst 102, 104 is also used to anticipate the location of the sync fields 114, which follow a given servo burst 102, but precede the next servo burst 104. It is important for the disc drive to be able to locate each sync field 114, because a sync field 114 permits the disc drive to anticipate the location of each bit within the data field 116 immediately following the sync field 114. In other words, each sync field 114 is used as a timing reference to permit synchronous decoding of the data field by the detection circuitry. As is illustrated upon line 118, which represents time, the disc drive opens time windows 120, during which it anticipates encountering subsequent sync fields 114. These time windows 120 are positioned using the last servo burst 102 as a point of reference. If a time window 120 expires without a sync field 114 being encountered, a conventional disc drive will not be able to read the data in the following data field 116, nor will it attempt to read data in subsequent sectors 106, 108. A conventional disc drive is designed to behave sequentially, meaning that it will read a given sector 106, 108 only if it was able to read the sector preceding it. If a time window 120 expires without a sync field 114 being encountered, a traditional disc drive will wait one entire revolution of the disc to attempt to reacquire the sync field 114 on the next revolution. A conventional disc drive is unable to reset its detection hardware to seek the sync field 114 immediately following the missed sync field 114. This form of behavior in response to a missing sync field 114 is undesirable in an audio-visual disc drive, which in some cases values data flow over data integrity.

A conventional disc drive displays behavior in response to an ECC-indicated error similar to the behavior in failing to detect a sync field 114. Normally, in a conventional disc drive, the integrity of a read operation is verified by making use of an ECC. After a conventional disc drive reads data from a data field 116, the data is verified against an associated ECC field 117. The ECC field 117 may be in the form of a cyclic redundancy code (CRC) or another appropriate error correction format. In a conventional disc drive, if the ECC field 117 indicates that the data from the data field 116 was incorrectly read, then the disc drive will cease reading subsequent sectors. Once again, because a conventional disc drive behaves sequentially, it will respond to a read-time error by waiting for the disc to make a complete revolution, and attempting to re-read the data on the subsequent pass. As in the aforementioned missing sync field scenario, this form of behavior in response to an errant ECC field 117 is sometimes undesirable in an audio-visual disc drive, because data flow is valued over data integrity.

Figure 2:
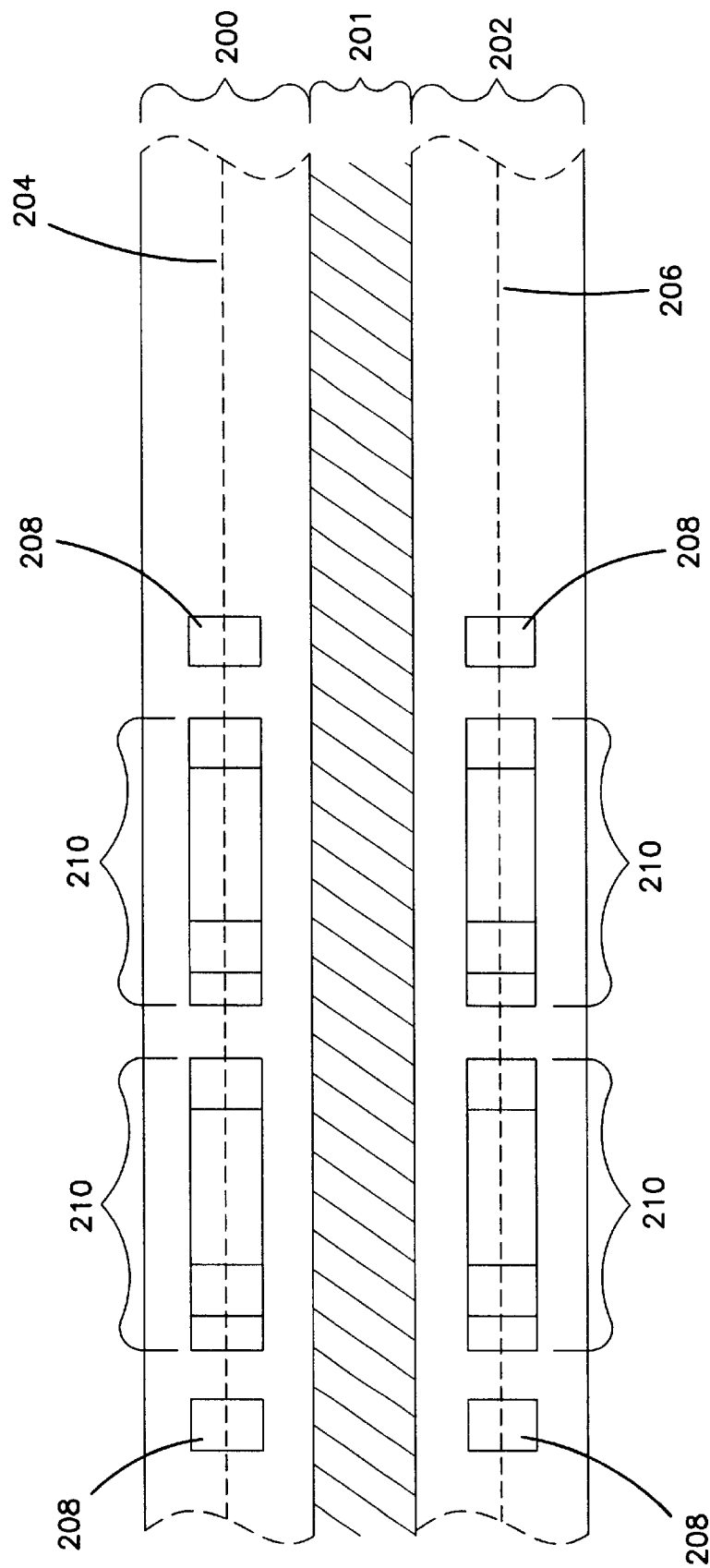
FIG. 2 is a depiction of adjacent tracks on a disc, represented linearly.

Conventional disc drives have also been designed to optimize informational integrity with respect to the manner in which such drives react to write-time errors. To illustrate the design choices applied in a conventional disc drive, the write-time behavior of a conventional drive will be discussed with regard to FIG. 2. In FIG. 2, two adjacent tracks 200, 202 are depicted. Although the tracks 200, 202 are generally circular and concentric with the center of the disc, they are depicted linearly in FIG. 2. Each track is separated by a guard band 201. The center 204, 206 of each track 200, 202 is illustrated as dashed lines. Data is intended to be stored on regions of the disc, centered about the center 204, 206 of each track 200, 202. During a write operation, a conventional disc drive detects servo bursts 208 as they pass under the head of the disc drive. The servo bursts 208 contain information from which the radial alignment of the head, velocity of the head, and the track number over which the head is oriented can be determined. From that information, the disc drive makes two determinations each time a servo burst 208 is detected: (1) whether the head is oriented over the proper track 200, 202 and (2) whether the head is anticipated to be centered about the track 200, 202 as it traverses the region of disc space preceding the next servo burst 208 and whether the head was centered about the track 200, 202 during traversal of the region of disc space following the preceding servo burst 208. Assuming these determinations are affirmative, the drive will write the sectors 210 which precede the next servo burst 208. Upon detecting the next servo burst 208, the same inquiry will be made again.

The reason that a conventional drive makes the aforementioned two-part inquiry is two-fold. First, a conventional drive is designed to maximize the probability that the data it writes to the disc can be subsequently properly read. Therefore, a conventional drive will attempt to write data to a region of disc space centered about the center 204, 206 of each track 200, 202, so that during a read operation the head will detect a maximally strong signal if the head is centered about the track's 200, 202 center 204, 206. Second, a conventional disc drive is designed to protect the overwriting of data stored on an adjacent track 200, 202. The disc drive will stop writing as soon as it determines that any one of the above-identified determinations is negative. Since, in a conventional disc drive, the firmware that monitors the orientation of the head is executed by a processor that multi-tasks between many tasks, the determination that a head is off-track may not be made until the disc drive is already writing a portion of sector 210 following the servo burst 208, which allowed the drive to determine that its head was off course. Even in that scenario, a conventional disc drive would immediately cease writing, potentially leaving old data in a portion of the sector 210 which the disc drive was in the middle of writing; a conventional disc drive would then wait a revolution, and retry the write operation on any sectors that fully or partially exist between the servo burst 208 that led to this decision and the previous servo burst 208. If not re-written, a half-written sector 210 would certainly be corrupt when read, because its ECC field 117 would correspond to the old data, and any data just written between the servo burst 208 that led to this decision and the previous servo burst 208 may be written off-track-center. This form of response to a write-time error is undesirable in an audio-visual drive, where data may not have time to be re-written.

Figure 3:
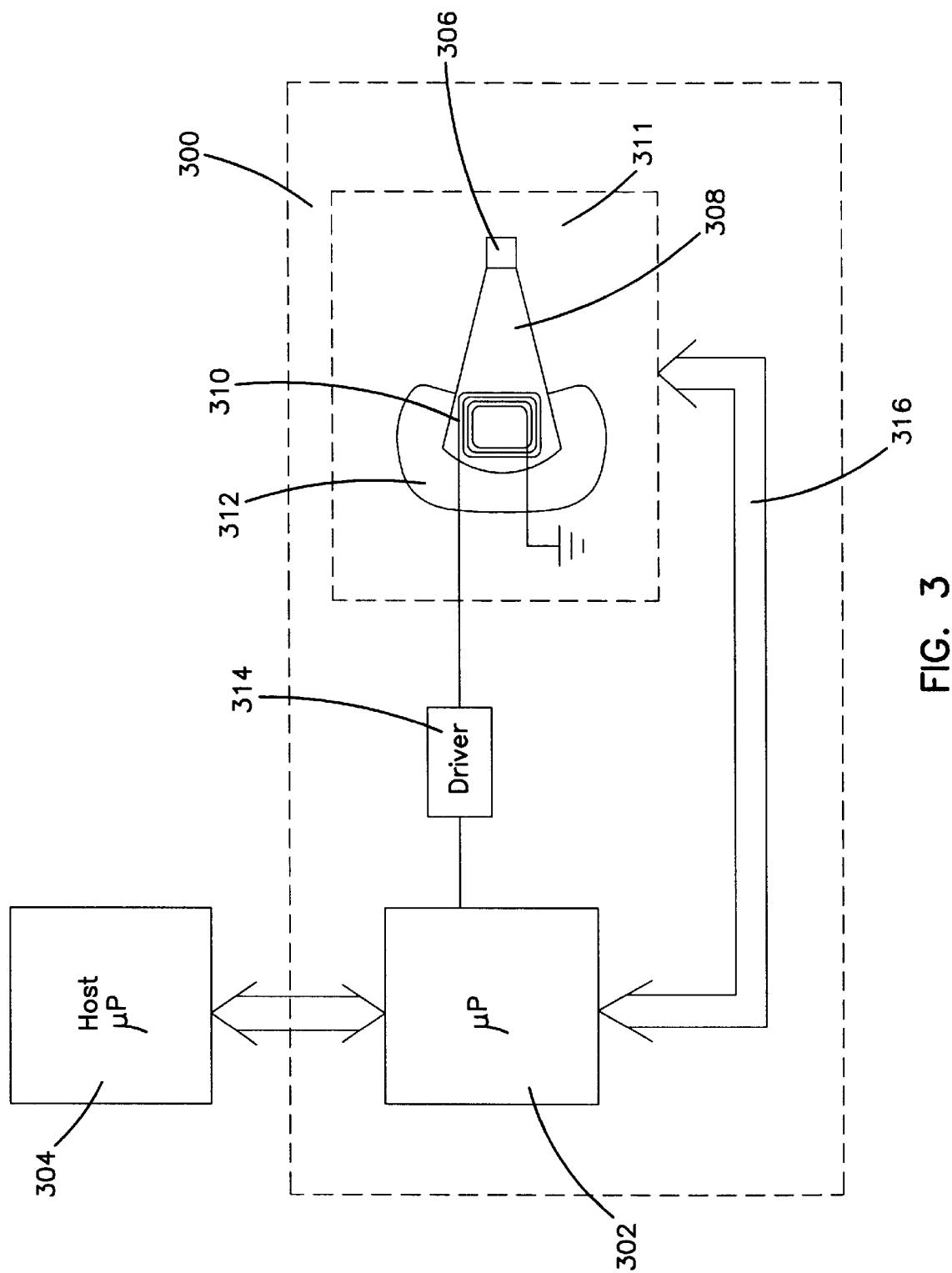
FIG. 3 is a depiction of an audio-visual disc drive constructed in accordance with one embodiment of the present invention.

A disc drive 300, addressing the data-flow issues identified in the discussion regarding FIGS. 1 and 2, and constructed in accordance with one embodiment of the present invention is shown in FIG. 3. The disc drive 300 is optimized for storage and retrieval of audio-visual data, and has an embedded microprocessor 302, which controls the operation of the audio-visual disc drive 300. The embedded microprocessor 302 communicates with a host microprocessor 304, which issues commands (such as read and write commands) to the embedded microprocessor 302. Firmware running on the embedded microprocessor 302 interprets the commands from the host microprocessor 304, and, in turn, controls the operation of the audio-visual disc drive 300.

The audio-visual disc drive 300 records and retrieves data from a disc (not illustrated in FIG. 3) via a read/write head 306, which is sensitive to the presence of localized magnetic fields on the disc. The read/write head 306 is located at the tip of an actuator arm 308. The actuator arm has a conductive coil 310, which is immersed in a magnetic field that is brought about by a neighboring magnet 312. When a current is driven through the coil 310, the actuator arm is subjected to a force resulting from the cross-product of the current and the magnetic field. The aforementioned force causes the actuator arm 308 to slew, and therefore causes the head 306 to change its location over the disc. The actuator arm 308, read/write head 306, conductive coil 310, and magnet 312 may be referred to collectively as a "servo actuator assembly" 311.

Assuming, for the sake of illustration, that the host microprocessor 304 were to issue a write command, that command would be received by the embedded microprocessor 302. The embedded microprocessor 302 would respond by supplying a voltage to the driver circuit 314, which would, in turn, supply a current to the coil 310, causing the actuator arm 308 to slew toward the proper location. When the embedded microprocessor 302 determined that the head 306 was located over the proper region of the disc, the embedded microprocessor 302 would control the head 306 to permit it to write the desired data to the appropriate location of the disc. The embedded microprocessor 302 communicates with the head 306 via a data path 316.

One important aspect of the present embodiment of the invention is that, unlike a conventional disc drive, the audio-visual disc drive 300 is not designed to maximize the acceleration of the actuator arm 308. Rather than being designed to maximize acceleration of the actuator arm 308 (and therefore minimize the average seek time), the audio-visual disc drive 300 is designed to ensure actuator arm 308 stability, for the purpose of minimizing the maximum or "worst-case" number of retries required for any one operation to be performed properly. Because a command time is equal to command time=seek time+rotate time+data transfer time+retry time, minimizing the number of retries has the effect of ensuring that the command time for a worst-case command is minimized.

Figure 5:
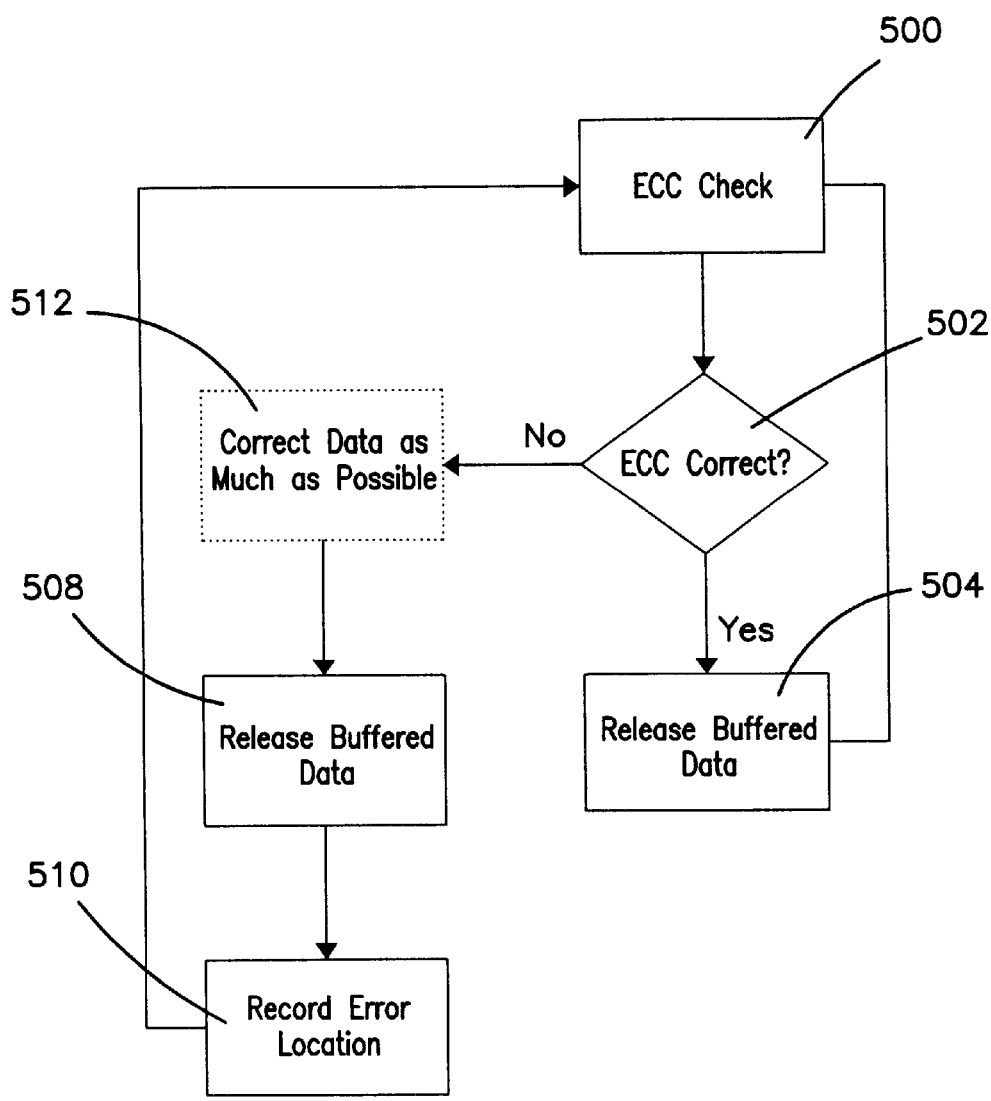
FIG. 5 is a flowchart depicting a method of behaving to another read-time error, in accordance with one embodiment of another aspect of the present invention.
Figure 6:
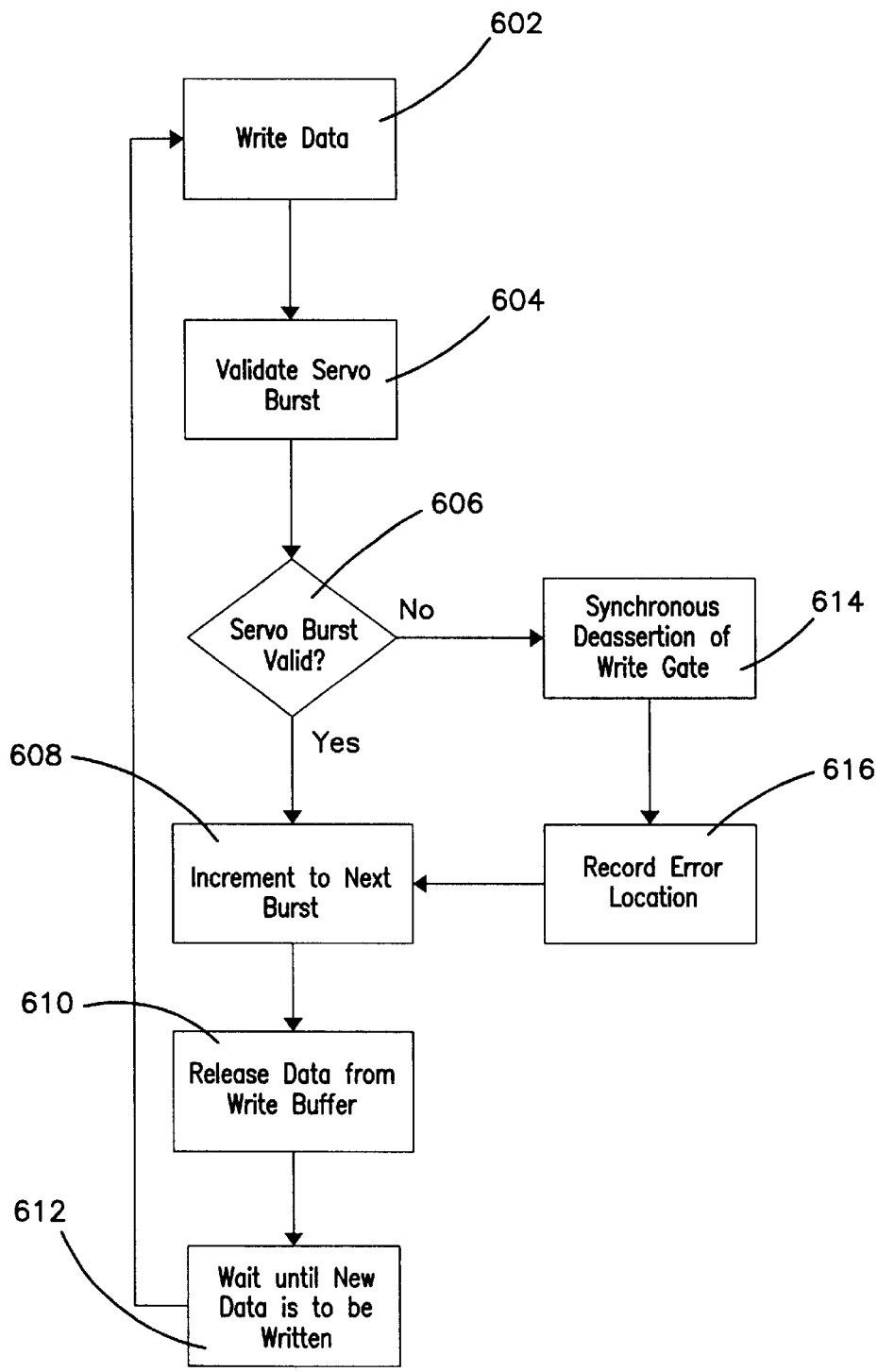
FIG. 6 is a flowchart depicting a method of behaving to a write-time error, in accordance with one embodiment of yet another aspect of the present invention.

Other aspects of the present invention are also directed toward minimizing the worst-case command time for the audio-visual disc drive 300. Firmware that effects this minimization operates on the embedded microprocessor 302. Individual electronic modules could embody the various aspects of the present invention in a manner analogous to its expression through the firmware operating on the embedded microprocessor 302. Whether the various aspects of the present invention be embodied in firmware or hardware, the flowcharts of FIGS. 4, 5, and 6, depict the operation of those various aspects.

Figure 4:
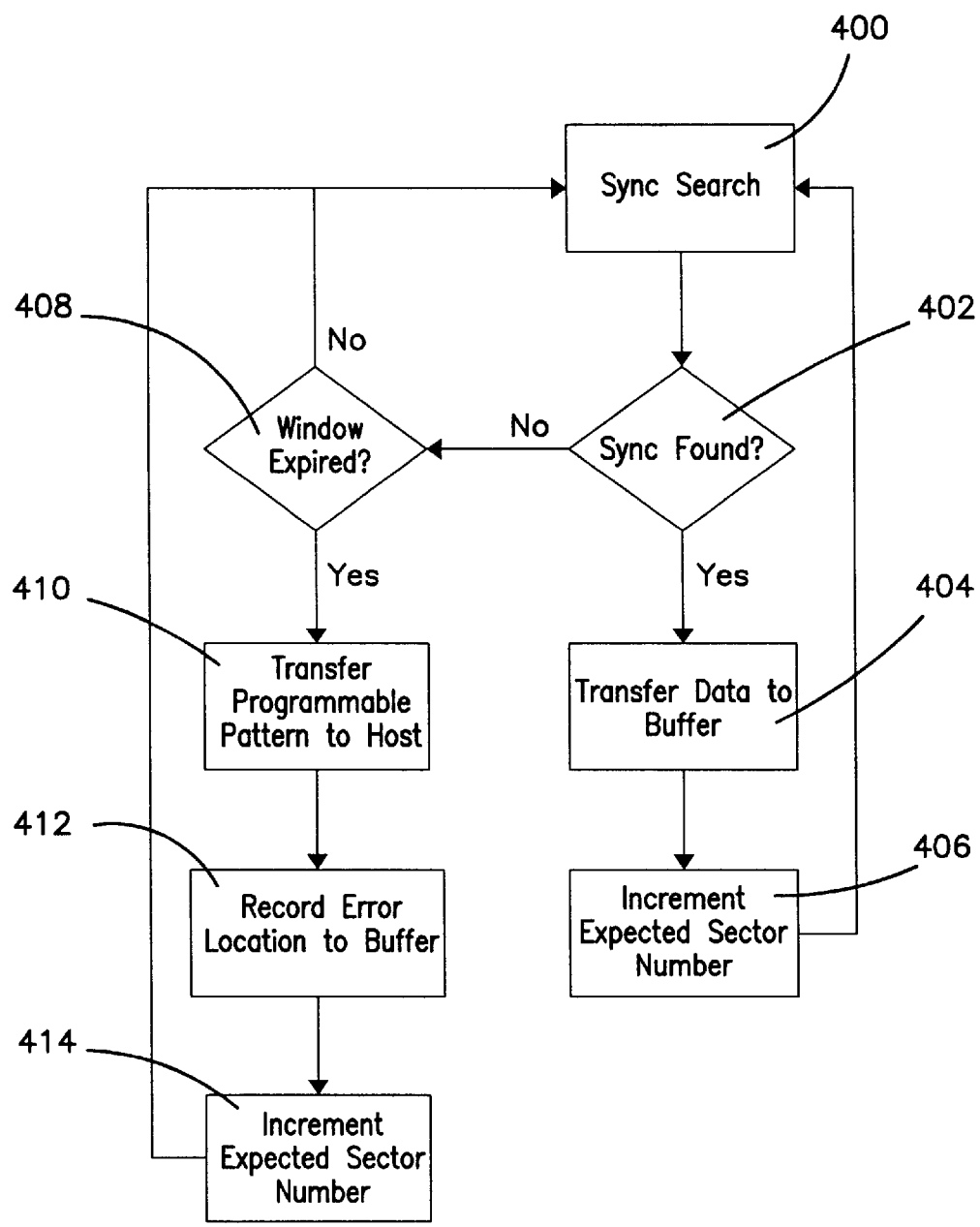
FIG. 4 is a flowchart depicting a method of behaving to a particular read-time error, in accordance with one embodiment of one aspect of the present invention.

FIG. 4 depicts the operation of firmware which is in accordance with one embodiment of another aspect of the invention. In FIG. 4, a flowchart depicts a manner by which the audio-visual disc drive 300 is controlled to react to a scenario in which a sync field is not detected during a read operation. The behavior depicted in FIG. 4 may be best understood by simultaneous reference to the track space representation presented in FIG. 1.

In search operation 400, a particular sync field 114 corresponding with a particular sector number, is sought. At intervals, control is transferred from search operation 400 to sync query operation 402, wherein it is determined whether or not the sync field of interest has been detected.

If the sync field 114 of interest was determined to have been detected, then control is transferred to data transfer operation 404, wherein data from the following data field 116 is communicated to a buffer. Thereafter, the sector number to be sought is incremented in increment operation 406, and control returns to search operation 400.

If the sync field 114 of interest was not determined to have been detected, then control is transferred to window expiration query 408, wherein it is determined if the durational time window 120 for detecting the sync field 114 has expired. If the durational time window 120 has not expired, then control is re-transferred to search operation 400, and the sync field 114 is once again sought.

If the durational time window 120 has expired, then the audio-visual disc drive 300 will act so as to simply pass along some sort of indicator that data within the given sector 106 is unreadable due to a missing sync field 114, and will reset itself to begin looking for the next sync field. The host microprocessor 304 may undertake to interpolate the missing data, if that reaction is desired. This form of behavior is a departure from the traditionally sequential behavior of a typical disc drive, and is aimed at minimizing the command time of the worst-case read scenario.

Returning to the issue of the specific steps taken if the durational time window 120 expires without the sync field 114 of interest having been detected, control is passed to transfer pattern operation 410, wherein a particular "fill pattern" is communicated to a buffer. The fill pattern may be programmable by the host microprocessor 304 and may be chosen to minimize the negative impact to the host, should it use the flawed data anyway. Upon completion of transfer pattern operation 410, control is optionally transferred to record error location operation 412, wherein the sector number of the unread data may be transferred to a buffer. The sector number of the unread data may or may not be communicated to host microprocessor 304 depending on whether the host microprocessor 304 is able to make use of the information. Finally, the sector number to be sought is incremented in increment operation 414, and control returns to search operation 400.

FIG. 5 depicts the operation of firmware which is in accordance with one embodiment of yet another aspect of the invention. In FIG. 5, a flowchart depicts a manner by which the audio-visual disc drive 300 is controlled to react to a scenario in which an ECC field indicates that the data field was misread. Once again, the behavior depicted in FIG. 5 may be best understood by simultaneous reference to the track space representation presented in FIG. 1.

In ECC verification operation 500, the ECC field 117 is checked against the data from the corresponding data field 116, so as to indicate whether the data field 116 was correctly read. Next, control is transferred ECC query operation 502, wherein it is determined whether or not the ECC field 117 corresponds with the data field 116.

If the ECC field 117 corresponds with the data field 116, then the data was indeed correctly read, and control is transferred to release data operation 504, wherein data from the data field 116 is enabled to be communicated to the host microprocessor 304, and set up to be flushed from the read buffer once the data field is communicated to the host. Thereafter, control returns to ECC verification operation 500.

If the ECC field 117 does not correspond with the data field 116, then the data was incorrectly read, but the audio-visual disc drive 300 will nonetheless communicate the errant data to the host microprocessor 304, and the data will simply be marked as incorrectly read, so that data from the subsequent sector may be read without waiting for the disc to make another entire revolution. Improperly read data may be replaced with data estimated, interpolated, or extrapolated by the downstream audio-visual system, if that response is desired. Once again, this is a departure from the traditionally sequential operation of a conventional disc drive, wherein data of a given sector 108 would be attempted to be read only after data from the preceding sector 106 was properly read. In order to effectuate the result just recited, control would transfer to optional ECC correction operation 512, which may attempt to provide error correction. Error correction may be incomplete, yielding only partially-corrected data. Control then transfers to release data operation 508, wherein the errant data (or partially corrected data) from the data field 116 is communicated to the host microprocessor 304, and flushed from the read buffer. Thereafter, control is transferred to record error location operation 510, so that the sector number of the errant data field 116 can be recorded and communicated to the host microprocessor 304. Finally, control returns to ECC verification operation 500.

FIG. 6 depicts the operation of firmware which is in accordance with one embodiment of yet another aspect of the invention. In FIG. 6, a flowchart illustrates a manner by which the audio-visual disc drive 300 is controlled to react to a scenario in which, after writing a sector to a disc, the subsequent servo burst indicates that either the head was off course during its traversal of the sectors immediately preceding the servo burst, or that the head is anticipated to be off course during its traversal of the following sectors. The behavior depicted in FIG. 6 may be best understood by simultaneous reference to the track space representation presented in FIG. 2.

In write operation 602, at least one sector is written to the disc. Control is next transferred to validation operation 604, wherein a two-part determination is made; it is determined (1) whether the head is oriented over the proper track 200, 202 and (2) whether the head is anticipated to be centered about the track 200, 202 as it traverses the region of disc space preceding the next servo burst 208 and whether the head was centered about the track 200, 202 during traversal of the region of disc space following the preceding servo burst 208. In validation query 606, the preceding determinations are conjunctively examined, for the purpose of determining the flow of operation. If both determinations are affirmative, the head has stayed on course during its travel to the servo burst 208 and that the head is anticipated to remain on course throughout its travel to the next servo burst 208. As previously discussed, a conventional disc drive undertook this inquiry for two reasons: (1) to maximize the likelihood that the data would be properly retrieved in the future (by ensuring that the data was written to regions of the disc which were within a certain distance from the centerline 204, 206 of the track 200, 202), and (2) to protect adjacent tracks 200, 202 from being overwritten. In the audio-visual disc drive 300, however, since data flow is a consideration of greater importance than data integrity, it is only the consideration regarding protecting adjacent tracks 200, 202 from being overwritten which motivates the two-part inquiry. Accordingly, the audio-visual disc drive 300 will have a looser tolerance with regard to how closely centered the head must be to the centerline 204, 206 of a track. The audio-visual disc drive 300 will allow the head to stray from the centerline 204, 206 of the track until the data integrity of the adjacent track 200, 202 is jeopardized. Although that tolerance should be determined empirically for each disc drive, the tolerance is anticipated to be about 20% off-track.

If, in validation query 606, the servo burst is determined to be valid, control is passed to increment operation 608, wherein the servo burst number to be sought is incremented, so that the next servo burst will be sought. Finally, in data release operation 610, the data that was just written between the servo burst leading to this decision and the prior servo burst is released from the write buffer, and the audio-visual disc drive 300 waits at wait operation 612 until it is time to write new data, whereupon control will return to write operation 602.

If, on the other hand, validation query 606 yields a result indicating an invalid servo burst (i.e. an off-track condition did, or will, happen), the control is passed to deassertion operation 614. In deassertion operation 614, a gate controlling whether or not data is written to the disc is deasserted so as to prevent data from overwriting the adjacent track. In the audio-visual disc drive 300, this deassertion step is performed synchronously with the end of sector 210, so that a sector is never left half-written. This is a departure from the operation of a conventional disc drive, in which the write gate would be immediately deasserted because data integrity was the most important consideration. Next, control is transferred to record error location operation 616, in which the host microprocessor 304 is informed of the location of the improperly written data. Finally, control is passed to increment operation 608, whereupon the normal flow of operation is resumed. Resuming a normal flow of operation is also a departure from the operation of a conventional disc drive, because conventional disc drives were designed to operate sequentially, not proceeding on to write a subsequent sector of a wedge (a wedge is a set of sectors interposed between two servo bursts) until the preceding wedge's sector had been properly written.

To summarize one embodiment of the present invention, a method for a disc drive to optimally handle a read-time error, in which a disc sector (such as 106, 108) is misread, may be effected by performing the following acts. Upon completion of reading a disc sector, the disc drive (such as 300) checks the ECC field (such as 117) against the data field (such as 116). Next, upon determining that the ECC field does not correctly match the data field, the disc drive (such as 300) transfers data from the data field to a host (such as in operation 508), and transfers information representing the errant sector to the host (such as in operation 510). The data transferred to the host may be partially corrected by an error correction function.

In an audio-visual disc drive (such as 300), an embedded microprocessor (such as 302) is used to execute firmware responsible for the operation of the disc drive (such as 300). The firmware performs the steps summarized in each aspect of the invention referred to above. The embedded microprocessor (such as 302) is operably coupled to a host microprocessor (such as 304), to a driver circuit (such as 314), and to a data path connecting running to a servo actuator assembly (such as 311).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for a disc drive to optimally handle a read-time error, in which a disc sector comprising a data field and an associated error correction code (ECC) field is misread, comprising acts of:
   (a) after completion of reading a disc sector, checking the ECC field against the data field;
   (b) upon determining that the ECC field does not correctly match the data field, performing the following acts:
      (i) attempting to partially correct the data and transferring partially corrected data from the data field to a host; and
      (ii) transferring information to the host indicating that the data transferred contains an error.

2. The method of claim 1 wherein act (b)(i) comprises transferring partially corrected data from the data field to a host.

3. A disc drive optimized to handle a read-time error, comprising:
   (a) a servo actuator assembly for orienting a head over a disc, to permit reading and writing to the disc;
   (b) a driver circuit, operably coupled to the servo actuator assembly, for driving the servo actuator assembly with a current, thereby orienting the head over a proper location of the disc;
   (c) an embedded microprocessor in the disc drive, the embedded microprocessor receiving commands from a host microprocessor, the embedded microprocessor operably coupled to the driver circuit, the embedded microprocessor also coupled to a data path between the servo actuator assembly and the embedded microprocessor, the embedded microprocessor being programmed to
      (i) after completion of reading data from a disc sector having a data field and an ECC field into a buffer, checking the ECC field against the data field;
      (ii) if the ECC field does not correctly match the data field, performing the following acts:
         (ii)(a) attempting partial data correction and transferring partially corrected data from the data field to a host; and
         (ii)(b) transferring information to the host indicating that the data transferred contains an error.

4. The disc drive of claim 3, wherein the transferring act (c)(ii)(a) of the embedded microprocessor comprises transferring partially corrected data to the host from the data field.

5. A disc drive optimized to store and retrieve audio-visual data, comprising:
   (a) a servo actuator assembly; and
   (b) a means for optimally handling a read-time error, by only partially correcting incorrectly read data from the disc drive so as to ensure reliable data flow.

* * * * *